United States Patent [19]

Mitchell

[11] 3,781,889

[45] Dec. 25, 1973

[54] RADAR SIDE LOBE ECHO ELIMINATOR

[76] Inventor: John K. Mitchell, 35 Mayfair Dr., Westwood, Mass. 02090

[22] Filed: Mar. 21, 1972

[21] Appl. No.: 236,628

[52] U.S. Cl. .................. 343/17.1 R, 343/100 LE
[51] Int. Cl. ............................................. G01s 9/06
[58] Field of Search ............... 343/100 LE, 17.1 R

[56] References Cited
UNITED STATES PATENTS

| | | |
|---|---|---|
| 3,191,173 | 6/1965 | Farner............................ 343/17.1 R |
| 3,510,871 | 5/1970 | Watanabe et al............. 343/100 LE |
| 3,403,394 | 9/1968 | Rouault........................... 343/17.1 R |

Primary Examiner—Benjamin A. Borchelt
Assistant Examiner—G. E. Montone
Attorney—Harry A. Herbert, Jr. et al.

[57] ABSTRACT

An apparatus for eliminating radar side lobe echos in returning radar signals. A single antenna is utilized to simultaneously receive radar pulse echos at two different frequencies. The two frequencies have main antenna beams which are equal in width but their respective side lobes do not provide coincidence.

4 Claims, 1 Drawing Figure

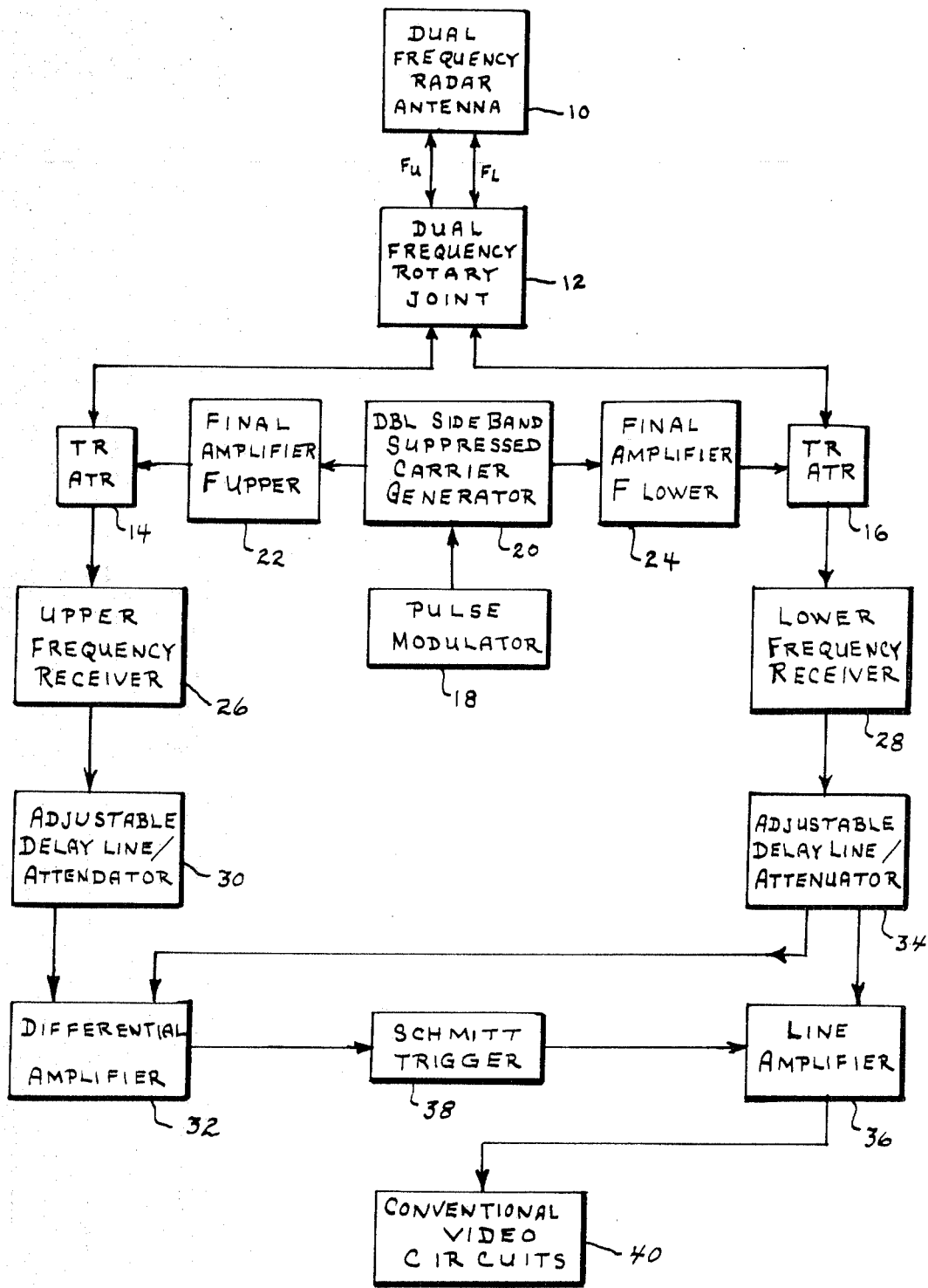

RADAR SIDE LOBE ECHO ELIMINATOR

BACKGROUND OF THE INVENTION

The present invention relates broadly to a radar system and in particular to a radar side lobe echo eliminator appratus.

In the prior art side lobe cancelling systems have been well known, however, these systems have generally employed two separate antennas and receivers systems. The use of two separate receivers, one for each antenna. requires an adjustment of amplitude in one of the receivers in order that their outputs may be subtracted to eliminate the undesired interferring signals. This method has obvious disadvantages since it involves the arduous problem essentially of matching two separate and complete radar systems to provide side lobe elimination. The problem is compounded when an airborne radar system is involved. The two complete antenna-receiver systems must be almost perfectly matched in bandpass, time delay and amplitude response. Furthermore, the prior art side lobe cancellation systems also require substantially a complete duplication of all intermediate frequency signal processing equipment being used with the radar.

In airborne radar systems interferring side lobe echos are particularly disruptive on flight operations. The information which is processed due to side lobe echos presents false alarms and targets to the flight personnel. This false information interferes with an airborne flight mission and with the efficiency of the crew in the performance of their mission. Therefore, in airborne applications especially, there exist a need for an apparatus such as the radar side lobe eliminator to overcome the problem of false information and alarms due to interferring side lobe echos.

SUMMARY

The present invention provides a radar side lobe echo eliminator apparatus utilizing simultaneously transmitted radar pulses at two separate frequencies. The radar pulses at the two frequencies are transmitted simultaneously from the same antenna. The main antenna beam of the higher frequency radar signal is shaped so that it is equal in width to the main antenna beam of the lower frequency. The frequencies of the radar signals are selected for non-side lobe coincidence. The video outputs of the two receivers of the returning echos are utilized in a cross-correlation circuit which is arranged to accept only main lobe echos and to reject echos that return by way of side lobes.

It is one object of the invention therefore to provide an improved radar side lobe echo eliminator which simultaneously transmits radar pulses at two frequencies from the same antenna.

It is yet another object of the invention to provide an improved radar side lobe echo eliminator apparatus having two frequencies with side lobes that do not coincide.

It is yet another object of the invention to provide an improved radar side lobe echo eliminator apparatus wherein the main antenna beam of the higher frequency is equal in width to that of the lower frequency.

It is still another object of the invention to provide an improved radar side lobe echo eliminator apparatus which prevents false alarms resulting from side lobe echos.

These and other advantages, features and objects of the invention will become more apparent from the following description taken in connection with the illustrative embodiment in the accompanying drawings, wherein the FIGURE is a block diagram of the radar side lobe eliminator apparatus in accordance with the present invention.

DESCRIPTION OF THE PREFERRED EMBODIMENT

There is shown in the FIGURE a radar side lobe echo eliminator apparatus utilizing a dual frequency radar antenna 10 to transmit and receive two selected radar signals at two separate frequencies simultaneously. As is the case in radar systems, a single antenna is utilized to transmit and receive a radar signal. A transmit-receive switch is utilized to select the transmission mode, either transmitting a radar signal or receiving a radar echo return. In the present invention, two frequencies rather than one are transmitted from antenna 10 simultaneously and two radar echo returns rather than one are simultaneously received. Antenna 10 is dual frequency radar antenna which transmits and receives an upper and lower frequency radar signal as described above. A dual frequency rotary joint 12 is connected to dual frequency radar antenna 10. The upper and lower frequency radar signals are applied to antenna 10 through rotary joint 12 and are received from antenna 10 through rotary joint 12 to be applied to transmit-receive switches 14, 16, respectively.

The pulse modulator 18 is connected to double sideband suppressed carrier generator 20 and modulates the carrier frequency of carrier generator 20 to provide an upper and lower frequency. The upper frequency is applied to final amplifier 22 to be amplified prior to application to transmit-receive switch 14. The lower frequency is applied to final amplifier 24 where it is amplified and applied to transmit-receive switch 16. When the system is in the transmit mode, the transmit-receiver switches 14, 16 are in the transmit configuration and the upper and lower frequencies are respectively applied to the dual frequency radar antenna 10. In the receive mode, the radar return signals from the antenna 10 are applied through the receive configuration of transmit-receive switches 14, 16 to their respective receivers 26, 28. The upper frequency receiver 26 is connected through adjustable delay line/attenuator unit 30 to differential amplifier 32. The lower frequency receiver 28 is connected through the adjustable delay line/attenuator 34 to differential amplifier 32 and line amplifier 36. The output of the differential amplifier 32 is applied through Schmitt trigger 38 to line amplifier 36. The output of the line amplifier 36 may be displayed on a conventional video display circuit unit 40.

The present invention utilizes conventional radar circuitry throughout with exception of the following features which will be fully discussed so as to permit one skilled in the art to practise the present invention. The antenna 10 differs from one of conventional design in the antenna feed system. The antenna feed system is comprised of two horns, one of which is located at the focal point of the reflector, and the other of which is defocused. The main beam of the defocused-horn is the same beam width as the one produced by the focused horn. A means of producing two simultaneous radar pulses at different frequencies is employed. This is accomplished by using two high power final amplifiers 22, 24 which are driven by a carrier generator 20. The carrier generator 20 produces two side bands with the carrier suppressed and is modulated by a pulser 18 to produce pulses of the desired repitition frequency and pulse width. The frequencies of the two side bands should be chosen so that their numerical ratio is at prime ratio such as ⅔, 2/5, 3/5, 2/7, 3/7, 5/7 etc. This will assure that side lobes will differ as widely as possible. Two receivers 26, 28 of which one is tuned to one of the side band frequencies and the other of which is tuned to the other are required. The video output of the receivers 26, 28 are compared by cross correlation unit in a manner to be described so that only echos received in the main radiation lobe of the antenna 10 will be passed through to the indicator or other conventional circuitry 40 making use of the receiver video output. The cross correlation circuit comprises a differential amplifier 32, a Schmitt trigger 38, a line amplifier 36, and delay lines and attenuators units 30,34.

The invention operates in the following manner. Simultaneous pulses at two different frequencies, for example, 1703 and 2299 $MH_z$ (13:19 ratio), are generated by pulse modulating a 2001 $MH_z$ with 298 $MH_z$. This produces low level pulses of 1703 and 2299 $MH_z$ frequency in a circuit that will suppress the 2001 $MH_z$ carrier and divide the two remaining frequencies into two remaining frequencies into two separate out-puts which can be fed to the two feed antenna 10. The returning echos will be amplified in their appropriate receivers and converted to video pulses which are compared in the cross correlation circuit. By adjustment of delay lines in one or the other of the receiver output circuits, the video pulses are made to coincide in the time domain. By adjustment of attenuators, calibrating echos which are received in the antenna main beam are made equal in amplitude at the input of a differential amplifier 32. The video pulses are also amplified in the line amplifier 36 which are blocked from operation by pulses that are generated by Schmitt trigger 38 from signals obtained from the differential amplifier 32. The threshold for operation of the Schmitt trigger 38 may be arbitrarily set so that small differences in main beam pulses due to the differing effects of the two frequencies do not cause their cancellation. When echos are received in the side lobes of the two frequency radiation patterns they may be time coincident but will differ in amplitude. In this case, the differential amplifier 32 presents a pulse to the Schmitt trigger 38 which exceeds its threshold, thus causing it to produce a blocking pulse which blocks the line amplifier 36 from passing the pulses that appear at that instant. If an echo is received in one lobe but not at the other frequency, the differential amplifier 32 produces a maximum differential signal to operate the Schmitt trigger 38.

Although the invention has been described with reference to a particular embodiment, it will be understood to those skilled in the art that the invention is capable of a variety of alternative embodiments within the spirit and scope of the appended claims.

I claim:

1. A radar side lobe echo eliminator apparatus comprising in combination:
    an antenna having a first and second feed horn, and a reflector, said first feed horn being positioned at the focal point of said reflector, said second feed horn being defocused with respect to said reflector, said first and second feed horns providing a pair of radar beam signals,
    means for simultaneously producing two radar pulse signals, said two radar pulse signals having different frequencies, said two radar pulse signals having a predetermined pulse width and repetition frequency, one of said two radar pulse signals being at an upper frequency, the other of said two radar pulse signals being at a lower frequency, said two radar pulse signals being applied to said antenna, said upper frequency being applied to said first feed horn, said lower frequency being applied to said second feed horn,
    a first receiver for receiving said upper frequency, said first receiver being connected to said antenna to receive said upper frequency, said first receiver providing a first video signal,
    a second receiver for receiving said lower frequency, said second receiver being connected to said antenna to receive said lower frequency, said second receiver providing a second video signal,
    a cross correlation unit connected to said first and second receiver, said cross correlation receiving said first and second video signals from said first and second receivers respectively, said cross correlation unit providing an output video signal, and,
    a video display means connect to said cross correlation unit, said video display means receiving said output video signal, said video display means providing a visual display.

2. A radar side lobe echo eliminator apparatus as described in claim 1 wherein siad means for simultaneously providing two radar pulse signals comprises in combination:
    a pulse modulator to provide a modulation signal,
    a carrier generator receiving said modulation signal, said carrier generator providing two sideband signals with the carrier suppressed, said two sideband signals being an upper and lower frequency,
    a first final amplifier receiving said upper frequency, said first final amplifier amplifying said upper frequency,
    a second final amplifier receiving said lower frequency, said second final amplifier amplifying said lower frequency, and,
    a first and second transmit-receive switch connected to said first and second final power amplifiers respectively.

3. A radar side lobe echo eliminator apparatus as described in claim 1 wherein said cross correlation unit comprises in combination:
    a differential amplifier to compare said first and second video signals, said differential amplifier providing an output pulse,
    a Schmitt trigger receiving said output pulse, said Schmitt trigger providing a blocking pulse, and,
    a line amplifier receiving said blocking pulse, said line amplifier providing said output video signal.

4. A radar side lobe echo eliminator apparatus as described in claim 2 wherein said two sideband signals comprise a pair of frequencies having a numerical ratio, said numerical ratio being a prime ratio.

* * * * *